United States Patent
Kunc et al.

(10) Patent No.: US 6,323,660 B1
(45) Date of Patent: Nov. 27, 2001

(54) INTEGRATED DEVICE FOR CAPACITIVE MEASURING OF NANOMETER DISTANCES

(75) Inventors: Vinko Kunc; Janez Trontelj, both of Ljubljana (SI)

(73) Assignee: Austria Mikro Systeme Ing. AG, Premstatten (AT)

( * ) Notice: Subject to any disclaimer, the term of this patent is extended or adjusted under 35 U.S.C. 154(b) by 0 days.

(21) Appl. No.: 09/171,988

(22) PCT Filed: Apr. 30, 1997

(86) PCT No.: PCT/SI97/00016

§ 371 Date: Jan. 25, 1999

§ 102(e) Date: Jan. 25, 1999

(87) PCT Pub. No.: WO97/41406

PCT Pub. Date: Nov. 6, 1997

(30) Foreign Application Priority Data

Apr. 30, 1996 (SI) .................................... P-9600141

(51) Int. Cl.[7] .................................................. G01R 27/26
(52) U.S. Cl. ........................... 324/661; 324/678; 324/686
(58) Field of Search ................................... 324/661, 662, 324/663, 676, 678, 686; 361/277, 287, 290

(56) References Cited

U.S. PATENT DOCUMENTS

| | | | |
|---|---|---|---|
| 5,065,103 | * 11/1991 | Slinkman et al. | 324/662 |
| 5,710,052 | * 1/1998 | Alvis et al. | 324/765 |
| 5,886,532 | * 3/1999 | Hsu et al. | 324/635 |
| 5,936,237 | * 8/1999 | van der Weide | 250/234 |
| 6,002,131 | * 12/1999 | Manalis et al. | 324/690 |

FOREIGN PATENT DOCUMENTS 612973  9/1994  (GB) .

OTHER PUBLICATIONS

Matsumoto et al., "Integrated Silicon Capacitive Accelerometer with PLL Servo Technique", Sensors and Actuators, vol.. A39, No. 3, Dec. 1, 1993, pp. 209–217.

Analog Devices ADXL50, Monolithic Accelerometer With Signal Conditioning, Rev. 0, pp 1–16, Jun. 1993.

Surface Micromachined, Digitally Force–Balanced Accelerometer with Integrated CMOS Detection Circuitry, W. Yun et al., Proc. IEEE, Solid State Sensor and Actuator Workshop, pp. 126–131, Jun. 1992.

* cited by examiner

Primary Examiner—Safet Metjahic
Assistant Examiner—Jermele Hollington
(74) Attorney, Agent, or Firm—Jacobson Holman, PLLC

(57) ABSTRACT

Within an integrated device for capacitive measuring of nanometer distances above a well formed in a substrate, one below the other, there are situated electrically conductive and electrically insulated plates, namely, a movable plate connected to the substrate, a sensing plate connected to an input of a follower amplifier, and a plate building up the electric field and being electrically insulated from the well and connected to a pulsing generator. The well is connected to the output of the follower amplifier and projects from below the sensing plate to the extent that the capacitance of the sensing plate with respect to the substrate is reduced to a minimum. At the drain of an input transistor within the follower amplifier a potential is maintained, which potential is changing in the same way as a potential at the output of the follower amplifier. The device of the invention makes possible an absolute measurement of distances. By an appropriate topology of the plates of the micromechanical sensor the parasitic capacitance of this sensor is eliminated, by means of an active circuit. The effect of parasitic capacitances in the pertaining electronic circuit is also eliminated.

4 Claims, 3 Drawing Sheets

INTEGRATED DEVICE FOR CAPACITIVE MEASURING OF NANOMETER DISTANCES

Figure 1:
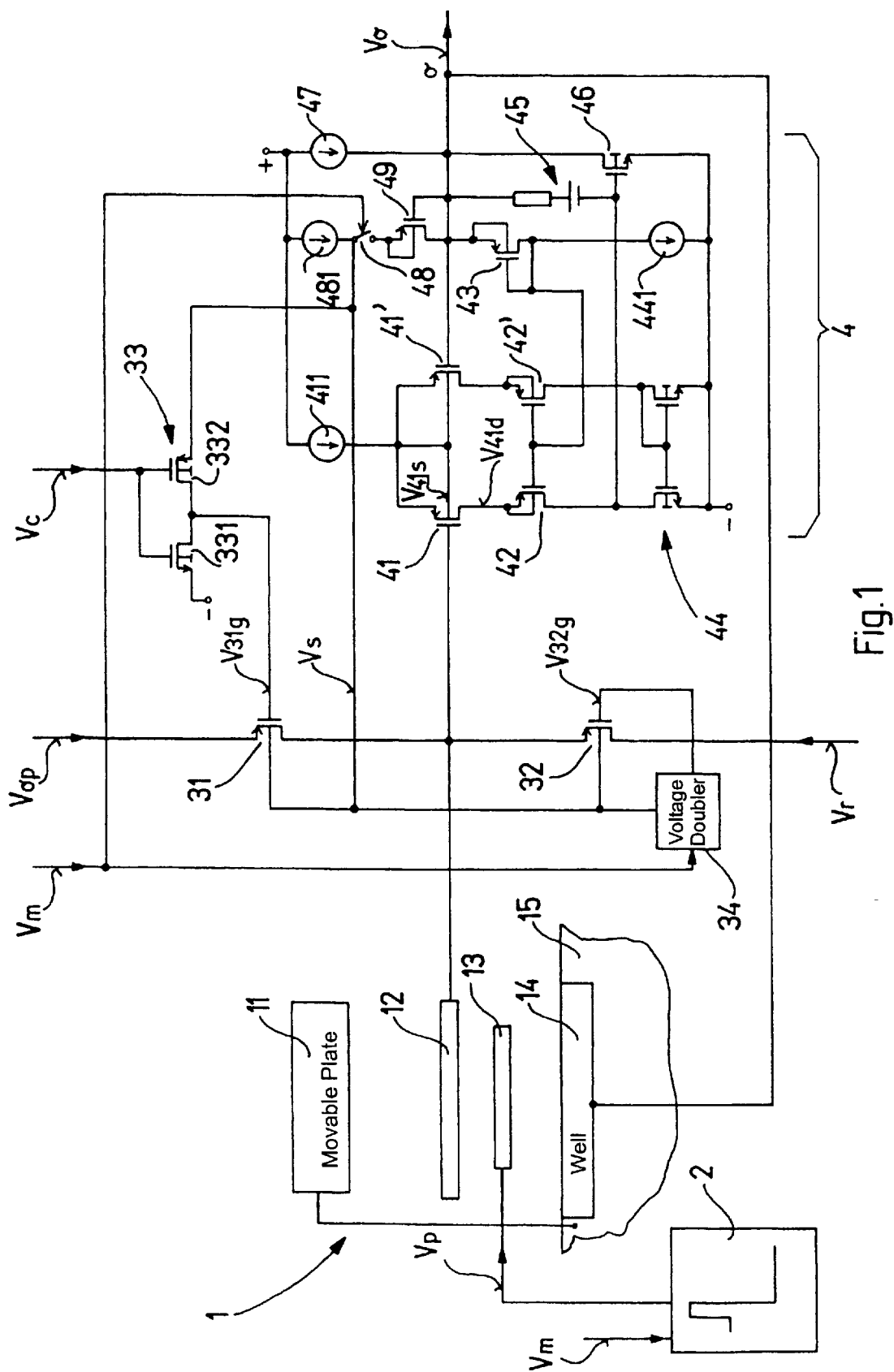

The invention concerns an integrated device for capacitive measuring of nanometer distances which makes it possible to measure absolute distances being of order of magnitude of one nanometer.

The technical problem to be solved by the present invention is how to remove an influence of parasitic capacitances in a micromechanical sensor itself as well as in a pertaining electronic circuit of an integrated device for measuring nanometer distances so that an absolute measurement of such distances would be feasible.

Devices for capacitive measuring of nanometer distances comprise a micromechanical sensor and an electronic circuit producing input signals for the micromechanical sensor and processing output signals of the sensor.

Hitherto developed devices for capacitive measuring of nanometer distances are fabricated mainly by a hybrid technique. They distinguish themselves in that their micromechanical sensor comprises a movable plate of several square millimeters and in that their measuring capacitance is even from 5 pF to 30 pF (Sensors and Actuators A, 39 (1993) 209–217). With these devices good results are obtained. The movable plate in the micromechanical sensor, however, is fabricated by a technology differing from the technology for producing of the pertaining electronic circuit. This is reflected in a high price of such devices.

Recently, some devices for capacitive measuring of nanometer distances have appeared in which also the movable plate of the micromechanical sensor is integrated together with the pertaining electronic circuit. In supplementary technological steps the micromechanical sensor is fabricated above the rest of the device whereat these supplementary steps do not represent any substantial change in the technology of manufacturing the integrated circuit. Therefore these devices are considerably cheaper than the aforedescribed ones. The measuring capacitance of the sensor, however, is only from 0.1 pF to 1 pF. Therefore the features of these devices are not so outstanding as those of the hybrid devices, nevertheless they are good enough for an application in numerous measuring systems. With respect to the pick-up of the signals the following two embodiments are used.

Very common is an embodiment based on a differential distance measurement. A movable plate of a micromechanical sensor is fastened between two fixed plates and with them it forms two capacitors (Analog Devices ADXL50). They are connected to signal generator outputs of an opposite phase. When the movable plate is situated in the middle between the fixed plates the signals cancel each other. The sensor output is connected to a synchronized demodulator. A disadvantage of this embodiment is an exacting fabrication of the movable plate and of the two fixed plates. Moreover, the central movable plate must be insulated with respect to the substrate since it is connected to the input of the electronic circuit in the device.

Further, also an embodiment having two micromechanical sensors connected to a bridge has been known (Proc. IEEE Solid-State Sensor and Actuator Workshop, pp. 126–131, June 1992). Also in this embodiment the movable sensor plates must be insulated with respect to the substrate.

A common disadvantage of all integrated devices for capacitive measuring of nanometer distances exists in that parasitic capacitances of the sensor plates with respect to integrated circuit layers below are strongly pronounced. The sensor output signal is additionally reduced by the parasitic input capacitance of the pertaining electronic circuit.

Known integrated devices for capacitive measuring of nanometer distances do not render possible an absolute distance measurement. The influence of parasitic capacitances therein is not sufficiently reduced that by a signal at the output of the micromechanical sensor the distance between the movable plate and the sensing plate of the sensor could be determined. However, since knowing this distance is crucial for an evaluation of the sensor sensitivity, known integrated devices for capacitive measuring of nanometer distances need to be calibrated mechanically.

The said technical problem is solved by an integrated device of the invention for capacitive measuring of nanometer distances, which device is characterized in that above a well in a substrate, one below the other there are situated electrically conductive and electrically insulated plates, namely, a movable plate, a sensing plate and a plate building up the electric field and being electrically insulated from the well, and the well projects from below the sensing plate to the extent that the capacitance of the sensing plate with respect to the substrate is reduced to a minimum. The plate building up the electric field is connected to a pulsing generator and the sensing plate is connected to the input of a follower amplifier and the well is connected to the output of the follower amplifier. The movable plate is connected to the substrate. At the drain of an input transistor within the follower amplifier a potential is maintained, changing in the same way as a potential at the output of the follower amplifier.

The device of the invention is further characterized in that the plate building up the electric field is formed above a first oxide layer and the sensing plate is formed in an upper metal layer of the integrated circuit with the plate building up the electric field screening a large part of the sensing plate.

The device of the invention is further characterized in that the potential at the input of the follower amplifier within a first time slot of each cycle equals a potential of the sensing plate and within a second time slot of each cycle on the sensing plate a potential is built up which causes the sensing plate to attract the movable plate so that the latter is moved back to the sensing plate.

And finally, the device of the invention is characterized in that within the first time slot after the expiration of the clock signal a potential at a substrate of two switching transistors, whose drain and source, respectively, are connected to the sensing plate and which are provided for switching between the first time slot and the second time slot, and the potentials on the gates of the two transistors are raised parallelly with respect to potential at the output of the follower amplifier.

The most important advantage of the integrated device of the invention for capacitive measuring of nanometer distances with respect to other devices of this type exists in that it makes possible an absolute measurement of distances. By choosing an appropriate topology the parasitic capacitance of the micromechanical sensor is removed in a simple way and by an active circuit the influence of parasitic capacitances in the pertaining electronic circuit is eliminated. The device of the invention distinguishes itself also by a very simply realized attachment of the movable plate to the device substrate.

Figure 2:
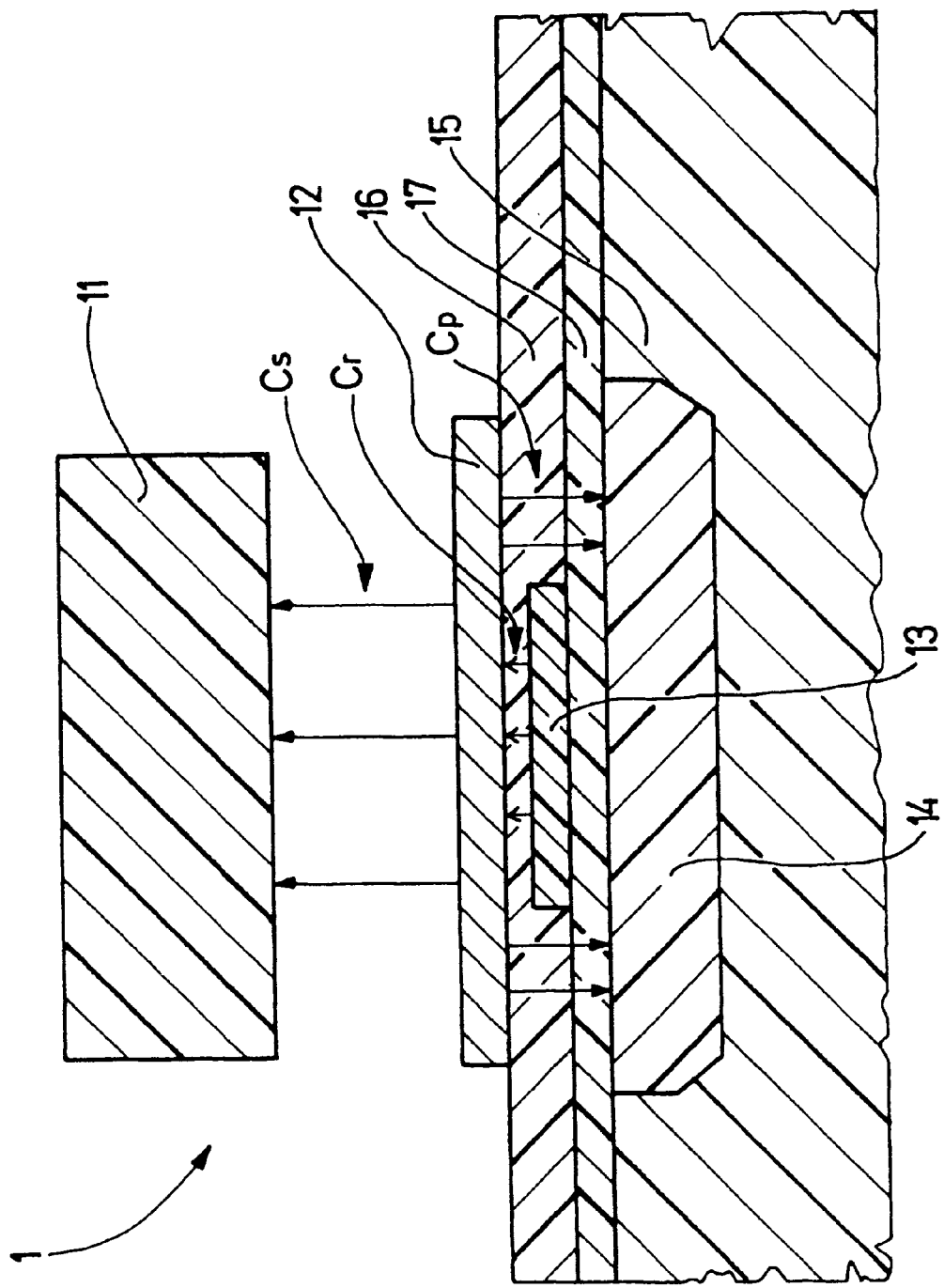
Figure 3:
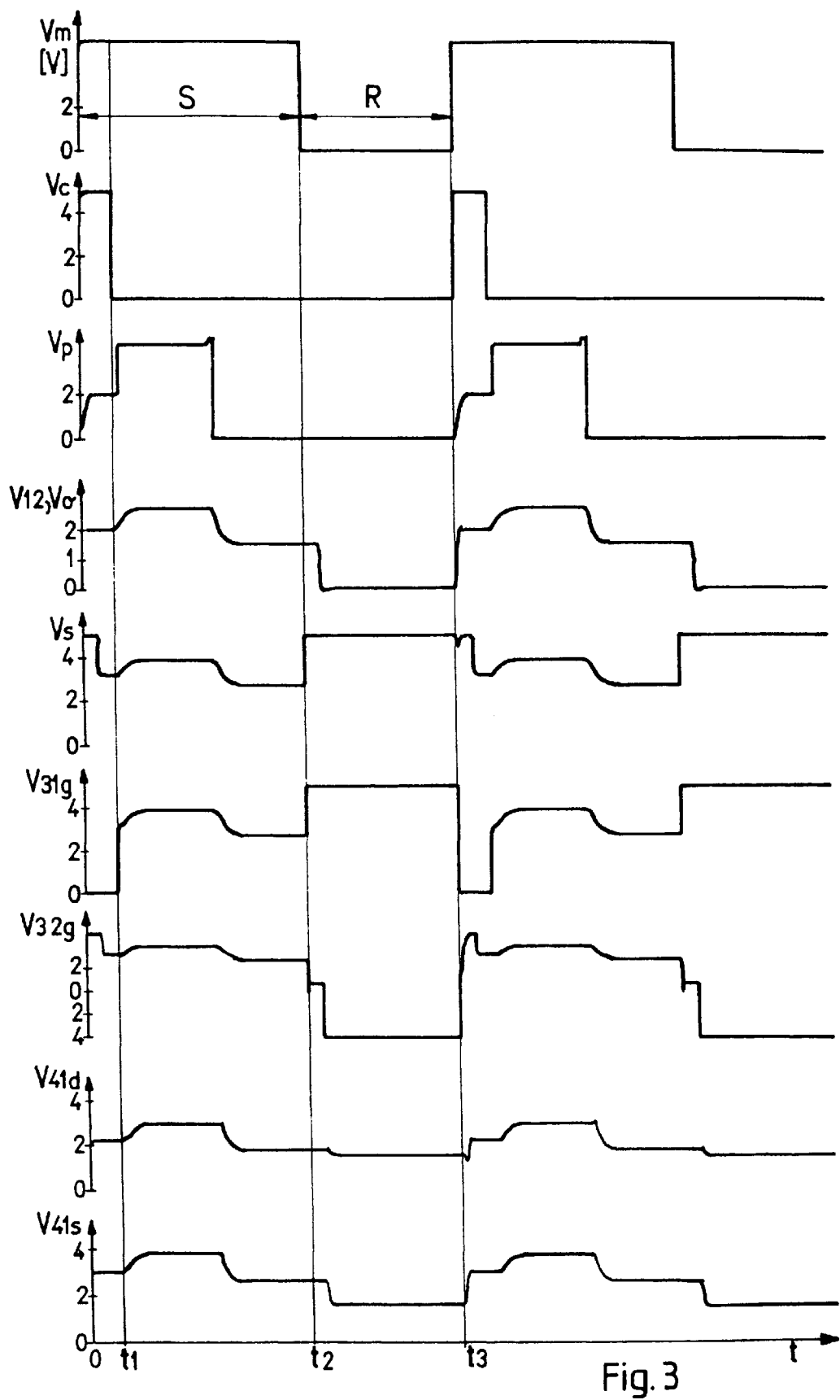

The invention will now be described by way of example and with reference to the accompanying drawings representing in:

FIG. 1 a circuit of an integrated device of the invention for capacitive measuring of nanometer distances, FIG. 2 a section across a micromechanical sensor in the device of the invention, FIG. 3 the time dependence of several potentials in the device of the invention.

The integrated device of the invention for capacitive measuring of nanometer distances comprises a micromechanical sensor 1, a follower amplifier 4 and several components, e.g. transistors 31, 32, a voltage doubler 34 and a negator 33 (FIG. 1), which are intended to improve the operation of the device according to the invention. To the device according to the invention also several signals are fed which will be described in the following.

The micromechanical sensor 1 comprises a movable plate 11, a sensing plate 12, a plate 13 building up the electric field and a well 14. These elements with the exception of the movable plate 11 are fabricated by a standard process of manufacturing an integrated circuit on a substrate 15 (the description relates to a p-type substrate) and they are electrically insulated with respect to each other (FIG. 2). The plate 13 building up the electric field is fabricated to cover a limited area on top of a first oxide layer 17. The plate 13 building up the electric field is situated on top of the well 14, the surface of the plate 13 being smaller than the surface of the sensing plate 12. In a second metal layer on top of a second oxide layer 16 the sensing plate 12 is fabricated which is situated above the plate 13 building up the electric field and, evidently, also above the well 14 in such a manner that the well 14 everywhere projects a little from below the sensing plate 12. The movable plate 11 is fabricated as a beam which is on one side fastened to the substrate 15 and the upper part of which is the movable plate 11 extending above the sensing plate 12.

Hence the movable plate 11 is electrically connected to the substrate 15. The plate 13 building up the electric field is connected to the output of a pulsing generator 2. The sensing plate 12, however, is connected to the gate of an input transistor 41 within the follower amplifier 4, whose output o is electrically connected to the well 14.

The follower amplifier 4 is made as follows. The drain of the input transistor 41 is connected through cascade-connected transistors 42 and 43 to the output o of the follower amplifier 4. A terminal common to the gates of the cascade transistor 42 and of a transistor 42' connected symmetrically to the transistor 42 and to the gate and the drain of the transistor 43 is connected through a current generator 441 to a low supply voltage terminal. Within the follower amplifier 4 its dominant RC element 45, an output transistor 46 and a transistor arrangement 44 are interconnected in a known way, the transistor arrangement 44 providing for a parallel variation of the potentials at the sources of the transistors 42 and 42'. The output o of the follower amplifier 4 is connected to the gate of a transistor 41' being connected symmetrically to the transistor 41. The emitters of the transistors 41, 41' are connected through the current source 411 to a high supply voltage terminal. The high supply voltage is conducted to the output of the follower amplifier 4 on the one hand through a current generator 47 and on the other hand through a series connected current generator 481, a controlled switch 48 and a transistor 49.

To the sensing plate 12 an operation point potential Vop is conducted through a transistor 31. The gate of the transistor 31 is connected through a negator 33, which is composed of transistors 331 and 332 and which is controlled by a clock signal Vc, to the common terminal of a switch 48 and of a current source 481. To this common terminal also the substrates of the transistors 31 and 32 and the control input of a voltage doubler 34 are connected. To the control input of the voltage doubler 34 a potential Vm is supplied which determines when the distance measurement is carried out and when a restoring force is exerted on the movable plate 11. By the potential Vm also the pulsing generator 2 and the switch 48 are controlled. The output of the voltage doubler 34 is connected to the gate of the transistor 32, to whose drain a potential Vr provided for the exertion of the restoring force on the movable plate 11 is connected.

The integrated device of the invention for capacitive measuring of nanometer distances actually operates as a capacitive voltage divider. This voltage divider consists of two capacitors. They are fabricated by using several integrated circuit levels. The first capacitor is a reference capacitor having a capacitance Cr with the plate 13 building up the electric field and the sensing plate 12 representing its plates, the second capacitor is a sensing capacitor having a capacitance Cs with the sensing plate 12 and the movable plate 11 representing its plates (FIG. 2). To the plate 13 building up the electric field square-wave pulses Vp of a known amplitude are conducted (FIG. 3). On the sensing plate 12 this amplitude is reduced by a factor Cr/(Cr+Cs) the capacitance Cs depending on the current position of the movable plate 11.

The amplitude of the potential V12 on the sensing plate 12 and, consequently, also of the potential Vo at the output o of the follower amplifier 4, however, would be much smaller if parasitic capacitances in the device of the invention or their effect had not been eliminated.

The parasitic capacitance between the sensing plate 12 and the substrate 15 is eliminated by the plate 13 building up the electric field screening a large part of the sensing plate 12 and especially by the well 14 connected to the output of the follower amplifier 4 being fabricated in the substrate 15 below the sensing plate 12. The well 14 projects from below the sensing plate 12 to such an extent that the parasitic capacitance of the sensing plate 12 with respect the substrate 15 is reduced as much as possible.

The effect of parasitic capacitances between the terminals of the transistors 41, 31 and 32, which are connected to the sensing plate 12, however, is eliminated by correctly chosen time dependences of potentials at these terminals. In a manner already mentioned, by means of the cascade connected transistors 42, 43 at the drain of the input transistor 41 a potential V41$d$ is built up changing in the same way as the potential Vo and therefore changing also in the same way as a potential at the gate of this transistor and therefore matching a potential V41$s$ at the substrate of this transistor 41 (FIG. 3). Thus the effect of parasitic capacitances between the drain and the gate or the substrate of the input transistor 41 is eliminated.

Also to the gate and to the substrate of the transistor 31 a potential Vs is conducted, whose level is shifted with respect to the potential Vo at the output of the follower amplifier 4. The potential Vo coincides with the potential V12 at the gate of this transistor. In this way the influence of the parasitic capacitance between the drain and the gate or the substrate of the transistor 31 is eliminated. Similarly also the effect of the parasitic capacitances between the drain and the gate or the substrate of the transistor 32 are eliminated, the transistor 32, however, does not conduct when actually measuring a distance.

In the manner described above the actual total parasitic capacitance in the device of the invention is reduced below 2 fF, which makes it possible that by means of this device the distance between the movable plate 11 and the sensing plate 12 of the micromechanical sensor 1 can be measured absolutely.

The operation of the device of the invention described so far refers to the measuring phase of the device operation.

However, the device operation is actually composed of time cycles, whereat in each cycle a first time slot S from t=0 to t=t2 is provided to perform the measurement of the distance between the movable plate 11 and the sensing plate 12 of the micromechanical sensor 1 and a second time slot R from t=t2 to t=t3 is provided to set the initial position of the movable plate 11 of the sensor 1, i.e. to attract the movable plate 11 to the sensing plate 12. The phase of the operation of the device of the invention is determined by the level of a control potential Vm (FIG. 3). During the measuring phase the potential Vm is at a high level, during the restoration phase, however, it is at a low level.

The control potential Vm changes to the high level whenever a pulse of the clock signal Vc appears (FIG. 3). The clock signal Vc stays at the high level so long—from t=0 to t=t1—that the sensing plate 12 of the voltage divider acquires a proper operation potential Vop. The pulsing generator 2 controlled by the signal Vm delivers a pulse Vp when the clock signal Vc appears.

In the first time slot S of each cycle, i.e. in the measuring phase of the device operation, the potential at the gate of the input transistor 41 within the follower amplifier 4 equals the potential V12 of the sensing plate 12. During the measuring phase the switch 48 controlled by the signal Vm is closed and at the potential Vs there are the substrates of the transistors 31, 32 as well the control input of the voltage doubler 34 through which actually the potential Vs is conducted to the gate of the transistor 32. When in the moment t1 the clock signal Vc jumps to the low level, the negator 33 passes the potential Vs also to the gate of the transistor 31. In this way in the main part of the measuring phase i.e. from t=t1 to t=t2, the effect of the parasitic capacitances of the transistors 31 and 32 is eliminated.

In the second time slot R of each cycle, i.e. in the restoration phase, on the sensing plate 12 such a potential is built up that the movable plate 11 is attracted to the sensing plate 12. The application of the sensing plate 12 also for performing the restoration of the movable plate 11 back to the sensing plate 12 is made possible by the transistor 32 being controlled by a voltage doubler 34. In the restoration phase from t=t2 to t=t3 the controlled switch 48 is open. At the control terminal of the voltage doubler 34 a high supply potential is established. At the transition from the measuring phase S to the restoration phase R the potential at the gate of the transistor 32 is changed from Vs, when the transistor 32 is closed, to the doubled potential of the low supply. The transistor 32 is opened completely and the movable plate 11 moves to the initial position.

Obviously the device of the invention for capacitive measuring of nanometer distances is also suitable for the measuring acceleration.

What is claimed is:

1. Integrated device for capacitive measuring of nanometer distances comprising a well (14) formed in a substrate (15), a plurality of electrically conductive plates situated above said well, and overlying each other, including a movable plate (11), a sensing plate (12) situated below said movable plate, and a plate (13) situated below said sensing plate building up an electric field, said plates (11, 12, 13) being electrically insulated from each other and from the well (14) wherein said well (14) projects from below the sensing plate (12) to such an extent that the capacitance of the sensing plate (12) with respect to the substrate (15) is reduced to a minimum, wherein said plate (13) building up the electric field is connected to a pulsing generator (2), and said sensing plate (12) is connected to the input of a follower amplifier (4), said well (14) is connected to the output (o) of the follower amplifier (4) and the movable plate (11) is connected to the substrate (15), said follower amplifier (4) including an input transistor (41) having a drain at which is maintained a potential (V41d) which changes in the same way as a potential (Vo) at the output of the follower amplifier (4).

2. Integrated device for capacitive measuring of nanometer distances as recited in claim 1, wherein said plate (13) building up the electric field is formed above a first oxide layer (17) and the sensing plate (12) is formed in an upper metal layer of the integrated device, wherein said plate (13) building up the electric field screens a large part of the sensing plate (12).

3. Integrated device for capacitive measuring of nanometer distances as recited in claim 2, wherein said potential at the input of the follower amplifier (4) within a first time slot (S) of each cycle is equal to a potential (V12) of the sensing plate (12), and within a second time slot (S) of each cycle, a potential is built up on said sensing plate (12) which causes the sensing plate (12) to attract the movable plate (11).

4. Integrated device for capacitive measuring of nanometer distances as recited in claim 3, wherein within the first time slot (S) after expiration of a clock signal (Vc) at two switching transistors (31, 32), whose drain and source, respectively, are connected to said sensing plate (12) and which are provided for switching between the first time slot (S) and the second time slot (R), a potential (Vs) on the substrate of the transistors (31, 32) and potentials (V31g, V32g) on the gates of the transistors (31, 32) are raised parallelly with respect to a potential (V0) at the output (o) of the follower amplifier (4).

* * * * *